L. M. FULLER.
SIGHT FEED.
APPLICATION FILED JULY 31, 1909.
975,127.
Patented Nov. 8, 1910.
2 SHEETS—SHEET 1.
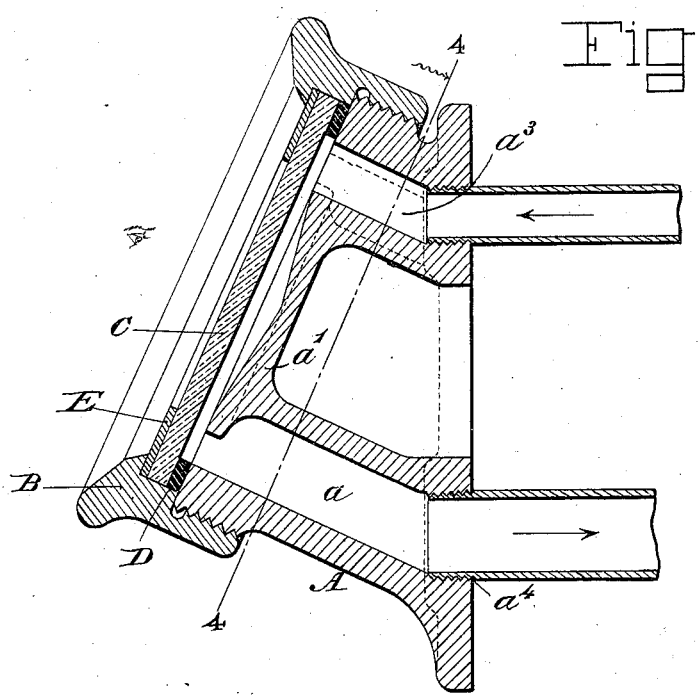
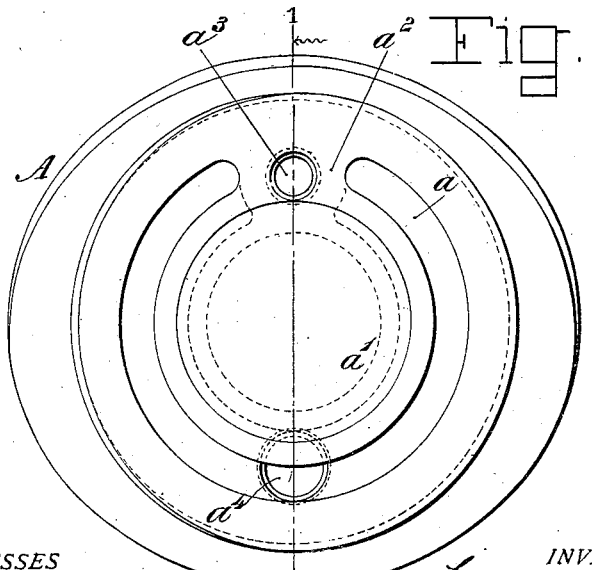
WITNESSES
INVENTOR
Attorneys.

L. M. FULLER.
SIGHT FEED.
APPLICATION FILED JULY 31, 1909.
975,127.
Patented Nov. 8, 1910.
2 SHEETS—SHEET 2.
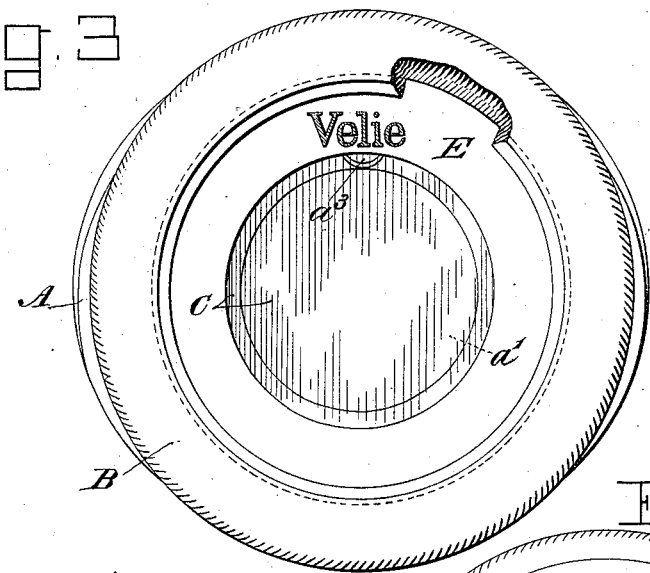
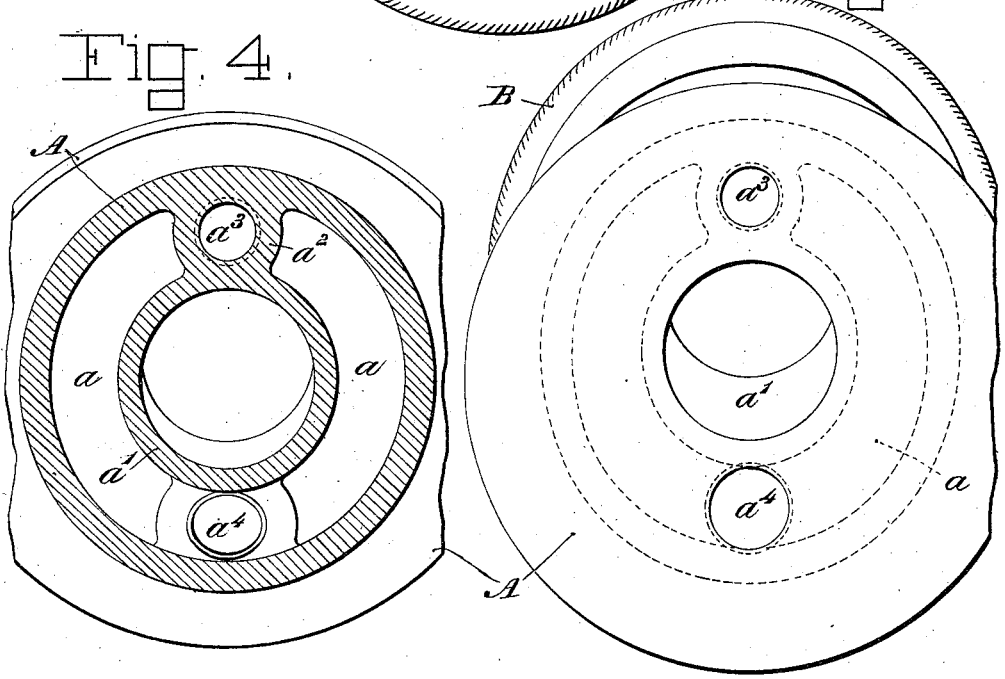
WITNESSES
Harry King.
Joseph C. Stack.
INVENTOR
L. M. Fuller
By Julian C. Dowell
Attorneys.

UNITED STATES PATENT OFFICE.

LAWSON MAYO FULLER, OF MOLINE, ILLINOIS, ASSIGNOR TO VELIE MOTOR VEHICLE COMPANY, OF MOLINE, ILLINOIS, A CORPORATION OF ILLINOIS.

SIGHT-FEED.

975,127.

Specification of Letters Patent.

Patented Nov. 8, 1910.

Application filed July 31, 1909. Serial No. 510,632.

*To all whom it may concern:*

Be it known that I, LAWSON M. FULLER, a citizen of the United States, residing at Moline, in the county of Rock Island and State of Illinois, have invented certain new and useful Improvements in Sight-Feeds; and I do hereby declare the following to be a full, clear, and exact description of the invention, such as will enable others skilled in the art to which it appertains to make and use the same.

My invention relates to devices designed to expose to view a portion of a fluid or oil conduit to enable a view to be had of the liquid flowing therethrough. Such devices are generally termed "sight-feeds."

To secure proper lubrication of a motor and to know with certainty that such lubrication is being secured, it is necessary to flow in sight, oil from the oil box of the motor. This shows that the oil pump is working properly and that a supply of oil is on hand.

The object of my invention is to provide an improved device for securing this result, as will be described with reference to the accompanying drawings and more particularly pointed out in the appended claims.

Referring to the drawings: Figure 1 is a section taken axially through an embodiment of the invention, the plane of section being indicated by the line 1—1 of Fig. 2. Fig. 2 is a front view of the body of the device taken from the viewpoint indicated in Fig. 1, the cover having been removed. Fig. 3 is a front view, the cover being in place on the body and a portion of the cover being broken away. Fig. 4 is a section on the line 4—4 of Fig. 1. Fig. 5 is a rear view of the device.

A indicates the body of the sight-feed; and in the illustrated embodiment of the device, this part is circular in cross-section and is formed with a base flange and with an exteriorly screw-threaded top. The body A is provided with an arc-shaped groove $a$ that opens through the top of the body but terminates short of its base. The groove $a$ forms a channel which extends partly around a central core $a^1$ that upstands from the base of the device, and is formed with a lateral extension $a^2$, preferably an integral connection joining the core and outer wall of the body, against which the opposite ends of the channel $a$ terminate. The core $a^1$ is adapted to form a spreader for oil flowing thereover; and although its surface may be flat, it is preferably formed with a conical depression, as shown.

An inlet duct or aperture $a^3$ extending throughout the depth of the body A is formed through the lateral extension $a^2$; and an outlet aperture $a^4$, extending through the base of the body A communicates with the arc-shaped channel $a$. The inlet and outlet apertures at their base are adapted for connection to inlet and outlet pipes as shown.

B denotes a cover having interior screw-threads engaging those of the body A, and formed at its opposite end with a dished rim defining a sight-opening. Between the dished rim and its screw-threaded portion, the cover is formed with an intermediate cylindrical bore of greater diameter than the sight opening, the rim defining which therefore forms a flange at the outside of said bore. The latter is adapted to receive a transparent plate C which may be kept a desired distance away from the spreader $a^1$ by means of a gasket D, interposed between that portion of the body A forming the outer wall of the channel $a$ and the plate C.

As a convenient means for exhibiting a name in connection with the device, a ring E having the desired indicia can be inserted between the flange of the cover defining the sight opening and the glass plate, exhibiting the indicia within said opening; and the indicia ring may be of a diameter as shown, which will conceal the channel $a$. When the device is assembled with the cover in place, the flange forming the sight opening will overlie the name-ring, which with the glass plate and gasket will be thus held in position between the cover and the body A. The outer edge of the cover B may be milled as shown.

In the use of the sight-feed it is connected in a lubricating system, which in general includes a pump for forcing the oil throughout the system, so that the oil will enter through the aperture $a^3$. The oil thus entering, is forced against the glass plate C between which and the opposed conically dished surface of the core or spreader $a^1$ the oil is spread out into a film that flows across the spreader. Gaskets D, differing in thickness, may be used to vary the thickness of the film of oil. When the gasket is of such thickness that the glass plate is not too near the spreader, the flow of oil assumes the appearance of a stream having the shape of an hour-glass; and if a thinner gasket be used the stream of oil flowing between the glass and spreader has the appearance of a darkened disk in the center of a light plate.

The conical depression of the surface of the spreader $a^1$, among its other advantages, directs the oil from the inlet aperture $a^3$ toward the center of the spreader.

Owing to the very prominent form which the film of oil is caused to assume under the sight opening, any failure of the oil pump to work properly will be plainly evidenced; it therefore provides a most positive telltale for proper or improper lubrication.

Although the shape of the illustrated embodiment of the invention is especially adapted for use on an automobile, it is understood that the invention is applicable to various lubricating systems.

I reserve the right to such modifications as fall within the spirit and scope of my invention.

Having described my invention, what I claim is:

1. A device of the character described comprising a body having an inlet duct and a channel formed with an outlet opening through which said channel discharges said body having a dished surface bounded by said channel, a cover having a sight-opening and adapted for attachment to the body, and a transparent plate mounted in said cover to confront said dished surface and disposed at a desired distance therefrom to form a space for the passage of fluid, the transparent plate and dished surface causing the column of oil to spread in its passage under said plate, and the fluid passing over the edge of said dished surface into said channel.

2. A device of the character described comprising a body having an inlet duct and a circular channel in communication with an outlet port, the portion of the body surrounded by the circular channel having a conically dished surface, a cover having a sight opening and adapted for attachment to the body, a glass plate mounted in the cover and confronting the conically dished surface, a gasket interposed between the glass plate and body to space the former away from said conically dished surface to provide space for the passage of oil thereover said gasket being of any desired thickness the fluid space between the glass plate and conically dished surface being determined by the thickness of the gasket whereby the form of the column of oil flowing under the glass plate is changed when gaskets of different thicknesses are substituted one for the other.

3. A device of the character described comprising a body having a base flange and a screw-threaded top and formed with an arc-shaped channel partly surrounding a central core, the latter having an extension joining it with that portion of the body forming the outer wall of said channel, an inlet duct being located in said extension and extending throughout its depth from base to top, and an outlet opening being formed through the base and communicating with the arc-shaped channel, a cover having screw-threads to engage those of the body and having also a sight opening, a glass plate mounted in the cover and retained therein by the flange of the cover defining the sight opening, and a gasket interposed between the glass plate and the outer wall of the arc-shaped channel.

4. A device of the character described comprising a body portion having an inlet duct and a channel formed with an outlet opening and having also a surface bounded by said channel over which surface the oil spreads in its passage from the inlet to the outlet opening, a cover adapted for attachment to the body and formed with a sight-opening defined by a flange, a transparent plate mounted in said cover to confront said surface over which the oil spreads, and a ring mounted in said cover and having a portion of its surface exposed to view in said sight opening, said ring concealing from view the channel bounding said spreading surface.

In testimony whereof I affix my signature, in presence of two witnesses.

LAWSON MAYO FULLER.

Witnesses:
 CHAS. S. DAHLQUIST,
 CHAS. B. ROSE.